United States Patent [19]

Rosenkranz et al.

[11] 3,969,060

[45] July 13, 1976

[54] APPARATUS FOR DEFORMING A TUBULAR SLUG OF THERMOPLASTIC MATERIAL

[75] Inventors: Otto Rosenkranz; Karl-Heinrich Seifert; Claus Horwege, all of Hamburg, Germany

[73] Assignee: Heidenreich & Harbeck Zweingniederlassung der Gildemeister AG, Germany

[22] Filed: Jan. 20, 1975

[21] Appl. No.: 542,486

Related U.S. Application Data

[63] Continuation of Ser. No. 275,139, July 26, 1972, abandoned.

[30] Foreign Application Priority Data

Aug. 20, 1971 Germany............................ 2141755

[52] U.S. Cl. .................. 425/387 B; 425/DIG. 204; 425/DIG. 215
[51] Int. Cl.² ........................................ B29D 23/03
[58] Field of Search .............. 425/DIG. 204, 387 B, 425/242 B, 392, 393, DIG. 215

[56] References Cited
UNITED STATES PATENTS

| | | | |
|---|---|---|---|
| 2,810,934 | 10/1957 | Bailey............................. | 425/326 B |
| 3,271,489 | 9/1966 | Fogelberg et al. .............. | 425/387 B |
| 3,311,950 | 4/1967 | Strauss........................... | 425/326 B |
| 3,422,174 | 1/1969 | Hagen............................. | 425/155 X |
| 3,531,556 | 9/1970 | Mehnert.......................... | 425/326 B |
| 3,717,429 | 2/1973 | Peters et al. ................... | 425/387 B |
| 3,792,140 | 2/1974 | Schiemann................. | 425/DIG. 204 |
| 3,843,302 | 10/1974 | Petzetakis...................... | 425/393 X |
| 3,899,279 | 8/1975 | Hudson et al.................. | 425/387 B |

Primary Examiner—Richard B. Lazarus
Attorney, Agent, or Firm—Cullen, Settle, Solman & Cantor

[57] ABSTRACT

A tubular slug of thermoplastic material is preheated and is then gripped at a position spaced from an open end of the slug, the gripping means being such as to effect a reduction in cross-section of the gripped portion of the slug. Such reduction in cross-section provides a shoulder which abuts the gripping means during application of pressure to the end face of the slug to deform the end portion thereof to provide a thread, groove or other profiled formation.

4 Claims, 5 Drawing Figures

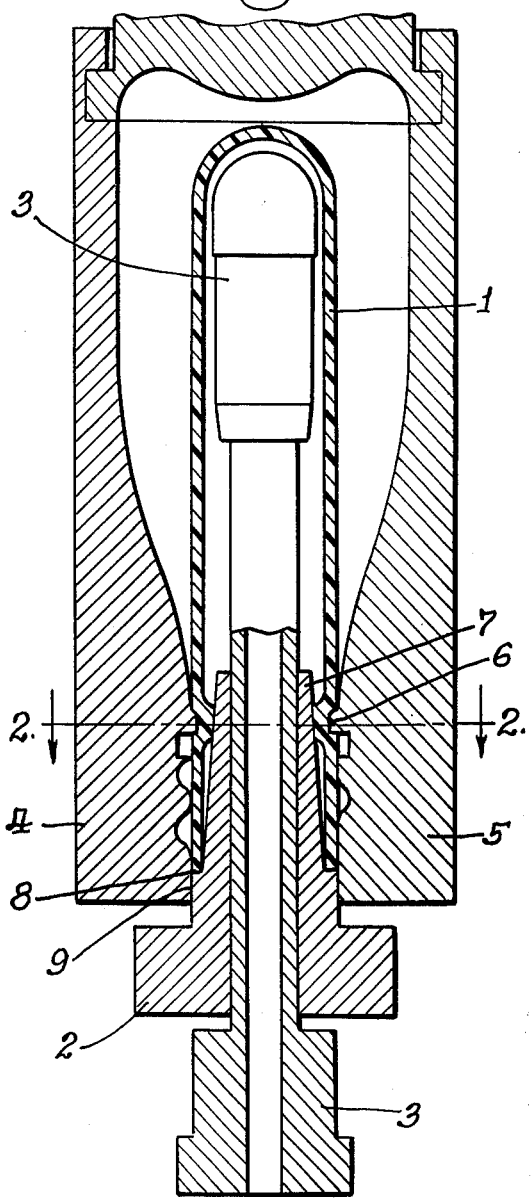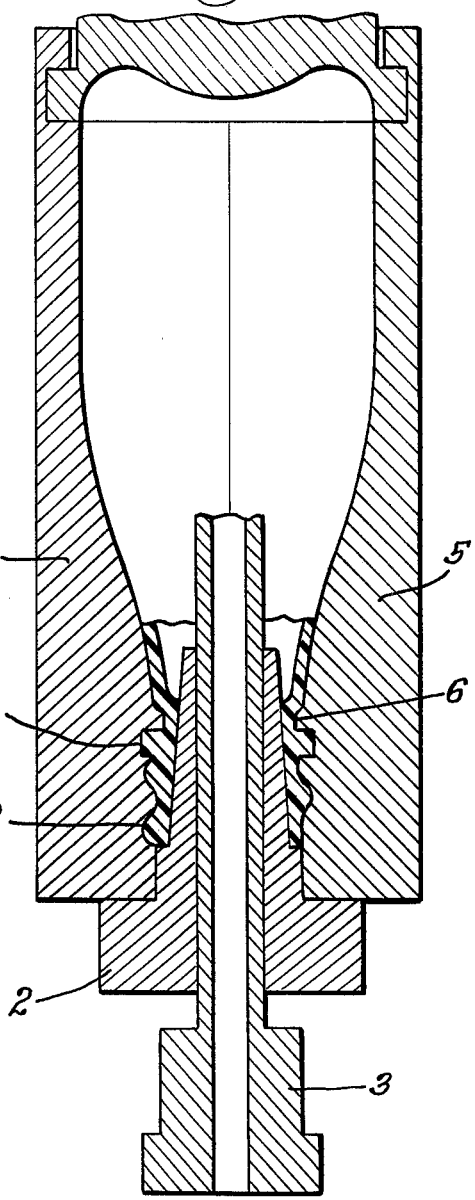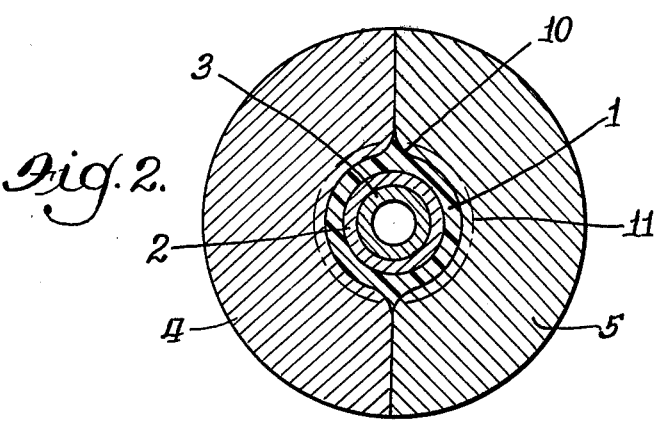

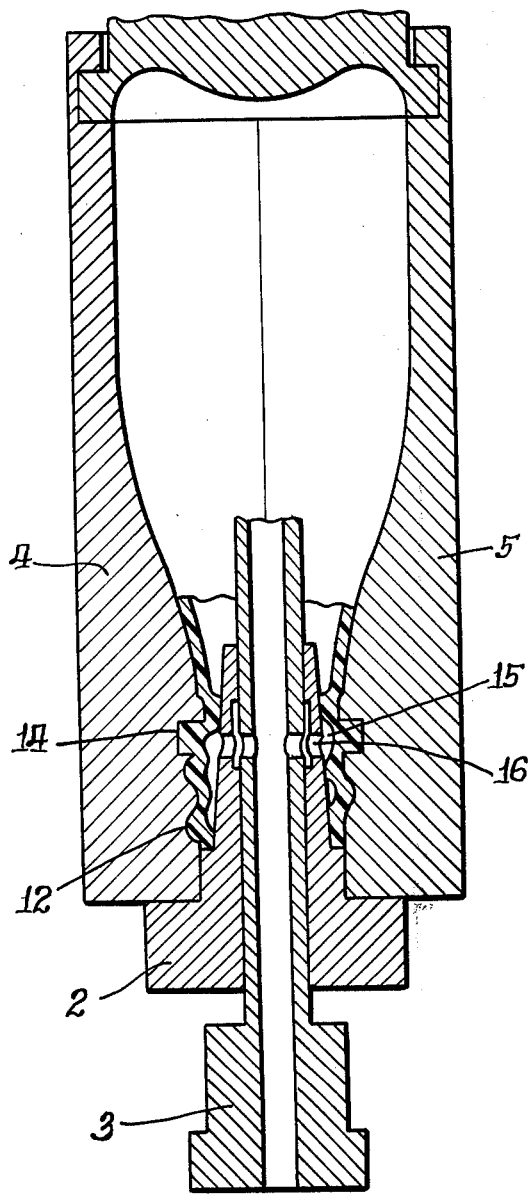
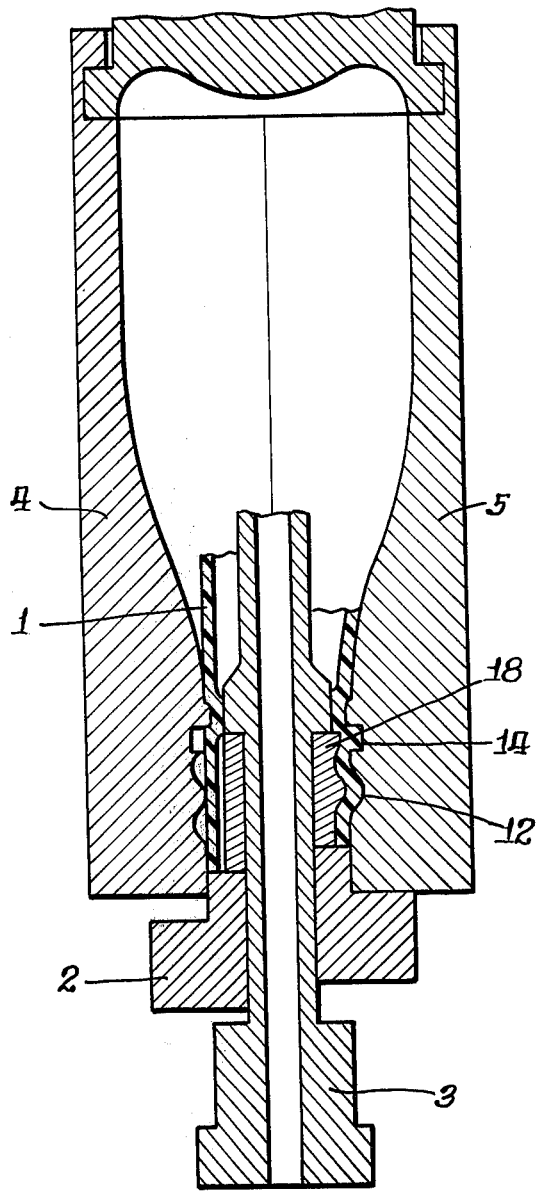

APPARATUS FOR DEFORMING A TUBULAR SLUG OF THERMOPLASTIC MATERIAL

This application is a continuation of application Ser. No. 275,139, filed July 26, 1972, and now abandoned.

BACKGROUND OF THE INVENTION

The present invention relates to a method of and apparatus for deforming an end portion of a hollow tubular slug which is open at one end and is made of thermoplastic material, threads, rings, grooves or other profiled formations being formed in the outer surface of said end portion.

It is known to produce changes in cross-section in the tubular ends of plastics slugs, in order to form chambers, grooves and threads using multi-part split cores which, for example by axial displacement, are radially adjustable and thus force the tube end which is to be deformed, into the profile of an external mould. In particular where small diameters are concerned, problems arise because the mould components are made up of relatively small, complex and vulnerable parts.

Similar drawbacks also apply to another known method of deforming the ends of plastics slugs by enlarging them with the help of rotating rollers carried on an axially displaceable cone. Where the tube diameters are small, it is difficult to accommodate the mould components; also, the opening up operation takes a long time and this makes it difficult to achieve high production rates.

Also known is a method in which the heated tube end is placed over a mandrel and a wall section of the tube is upset by means of an axially displaceable tool, the plastics material which is being deformed being forced at the upsetting location into a mould cavity so that it forms a fold. A particular disadvantage of this method is that, where the wall thickness is small in comparison to the diameter, the fold cannot be produced with any accuracy. Frequently, additional folds appear at the upsetting location, and these detract from the appearance of the finished article.

Further, it is known to enlarge the end of a tube held in an external mould, by using an axially displaceable mandrel which enlarges the tube end from the end face, producing the desired cross-sectional shape. In this context, however, accurate cross-sectional shapes cannot be produced. Again, the versatility of the moulds is limited because the mandrel cannot contain any undercuts.

In addition, it is known to insert an annular body of elastically deformable material into the tube end, and, by axial compression or radial enlargement of the annular body, to provide the tube wall with grooves or the like. This method, too, does not of itself satisfy all the requirements of industrial production in terms of rapid and accurate changing of cross-section.

An object of the invention, therefore, is to create a simple method and apparatus, in particular for application to small diameter tubes, by which one can rapidly and accurately modify the cross-section of a tubular end portion of a thermoplastic hollow slug which has been preheated to a readily deformable state, without at the same time incurring a high scrap rate.

SUMMARY OF THE INVENTION

In accordance with the invention, the hollow body is gripped at a position spaced from the tube end and a reduction in section thereby produced, the tube end portion then being deformed by the application of pressure to its end face.

The reduction in section, or waisting, of the preheated tube end portion is used as a means of securing and sealing. The material of the tube end is clamped by the waisted portion, and contact between the tube end and corresponding parts of the gripping tool produces cooling and increasing solidification of the tube end in the region of the waisted zone so that the tube end is held securely during the ensuing application of axial pressure to effect reshaping. During the shaping operation, the clamping of the tube end is the sole means of fixing the hollow body and, in fact, the hollow body can be modified or reshaped at either side of the fixing location in an independent manner, that is to say at one side a profile can be produced and at the other side the hollow body can be blow-moulded, for example to give it its final form.

The tubular end of the hollow body can be gripped between a core and an outer ring, the ring consisting of at least two parts which are component parts of an external mould and, when the latter is closed, reduce the external diameter of the tube end by between 2% and 10%. Preferably, a section reduction of about 5% will be produced.

The ring can be radiussed at the split plane of the external mould so that the tube material cannot penetrate into the joints. This prevents any flash from forming in the region of the waisted zone. The tube end which is deformed then contains rounded formations although these are in no way disadvantageous in subsequent use.

The core engaging in the tube end is preferably provided with a shoulder and is conical in shape with a cone angle of 0.2° to 3°. Tapering of the core facilitates the extraction of the hollow body from the mandrel, after the forming operation. The end surface of the tube comes up against the shoulder of the mandrel.

In those cases in which the profile which is to be produced has a substantial volume, the core would have to execute a correspondingly longer travel in order to ensure complete filling the mould cavity. In so doing, the wall thickness in this area would become unnecessarily large and this is uneconomical. In accordance with a further feature of the invention the core is provided between the ring and the tube end with exit orifices for a liquid or gaseous pressurised medium. It is particularly advantageous in this context if the core is axially displaceable. Movement of the core and the supply of the pressurised medium can then take place simultaneously.

The pressurised medium produces a cavity between the internal wall of the tube and the core so that even when a deep profile is involved, the wall thickness of the tube end can be kept relatively small. In order also to be able to produce fine profiles, the pressurised medium has a pressure substantially higher than the normal blow-moulding pressure. In particular, it is convenient to supply to the blow-moulding tube a short pressure pulse in order to form the tube end, but to isolate this pressure pulse from the actual blow-moulded cavity of the hollow body.

The exit orifices for the pressurised medium may be so arranged in the core that, in the terminal position of the latter, they are located opposite the largest of the cavities being formed. The pressurised medium may be supplied through several sharp-edged orifices. This ensures a better distribution of the pressurised medium. Furthermore, the exit orifices will preferably be of very small diameter. Consequently, in its readily deformable state, the thermoplastic material cannot penetrate into these orifices. It is convenient, furthermore, to apply a lower pressure, for example the blow-moulding pressure which is being used, to the mould cavity at least until the thermoplastic material has cooled down (at least at the surface) below its solidification point.

A high-elasticity sleeve may be used to shape the tube end by axial contraction, the sleeve being inserted between the core and an axially displaceable mould section. Thus, the sleeve is conveniently held in the axial direction by the ring formed on the mandrel shank in order to effect the reduction in section and said axially displaceable mould section. Axial movement of the mould section in the direction towards the waisted portion of the hollow body, then compresses the elastic sleeve axially and consequently produces an increase in its diameter. As a result, the tube end portion being deformed is forced into the profile of the external mould components.

The tool face which abuts the end face of the tube is preferably a shoulder produced on the mould section or the core. Consequently, sealing surfaces for any closures or covers which may later be applied are produced and these surfaces are free of any burrs and joins.

BRIEF DESCRIPTION OF THE DRAWINGS

FIG. 1 is a sectional view of a first form of apparatus having a blow-mould and an axially displaceable core, the core being shown in its initial position;

FIG. 1a illustrates the embodiment of FIG. 1 with the core in its terminal position;

FIG. 2 is a section through the apparatus along the line of section indicated by the arrows in FIG. 1;

FIG. 3 is a sectional view of a second form of apparatus having a blow-mould and an axially displaceable core in which a pressurised medium is introduced; and FIG. 4 is a sectional view of a third form of apparatus in which a high-elasticity sleeve is utilised.

DESCRIPTION OF THE PREFERRED EMBODIMENTS

For the embodiment shown in FIGS. 1 and 2, a tubular moulded slug 1 is assembled in a readily deformable state, i.e. at a temperature above the solidification point thereof, between two blow-mould halves 4 and 5. Displaceably assembled on the blow-moulding mandrel 3, there is a mould section 2 which extends in the form of a core 7 into the open end of the tubular slug 1. The core 2 projects into the tube end and has a slight taper with a taper angle of between 0.2° and 3°, preferably about 0.7°. The core 7 is, furthermore, provided with a shoulder 8 which forms the subsequent end face of the aperture in the hollow body and against which the slug 1 initially seats. On the blow-mould halves 4 and 5, a ring 6 is formed which has a diameter which is smaller, by between 2% and 10%, preferably about 5%, than the initial diameter of the slug 1.

The shoulder 8 is contiguous with a cylindrical section 9 which is surrounded without any clearance by the blow-mould halves 4 and 5. As shown in FIG. 2, the ring 6 is provided, at the plane of separation of the blow-mould halves 4 and 5, with radiussed recesses 10 into which, when the mould halves are closed and the tube end is constricted between the ring 6 and the core 7, thermoplastic material can penetrate so that the plane of separation remains free of any flash. The blow-mould halves are furthermore provided with profiled formations 12 and 13 in the form of rings, threads, grooves or the like.

After closing of the blow-mould halves 4 and 5 and the consequent constriction of the tube end portion between the ring 6 and the core 7, the mould section 2, together with the core 7, is displaced axially so that the tube end portion is deformed and the profiled formations 12 and 13 are filled. The diameter of core 7 determines the tube internal diameter and the shoulder 8 of the mould section 2 produces a burr-free end face on the tubular hollow body, and avoids any scrap. In this moulding operation, the tube end portion is held by the constricted portion, in the area of which the tube has already been cooled by contact with the mould halves 4 and 5 and therefore undergone increasing solidification. In addition, arrangements can be made to cool the blow-mould halves. During the moulding operation of the tube end, the slug is also blow-moulded to give it its final form, the configuration of the formed article depending on the configuration of the mould cavity.

The shaping of the tube end portion to produce a profiled contour in it can be carried out in a variety of ways. In one embodiment, the core used to reshape the tube end is displaceable in relation to the external mould. By axial displacement of the mandrel in the direction towards the gripping ring which is used to produce the reduction in section, the annular mould cavity between the core and the external mould is reduced. Because the material has already partially solidified in the neighbourhood of the ring, the mould cavity can only be reduced at the point at which it is filled by the tube material. This can be done as long as the force exerted upon the core is sufficient, considering the small cone angle, to urge the tube material outwardly in the neighbourhood of the ring. The forming operation takes place very quickly so that the total shaping time is determined predominantly by the time taken to cool the material below the solidification point. So far as obtaining a high production rate is concerned, it is advantageous, by using components which have good thermal conductivity and providing suitable cooling means, to bring the moulding temperature of the thermoplastic material rapidly below the solidification point.

The embodiment shown in FIG. 3 is intended in particular for the production of profiled formations 14 which have a substantial volume. Thus, the stroke of the mould section 2 is relatively large. As shown in FIG. 3, the blow-moulding tube 3 and the core of the mould section 2 are provided with exit orifices 16 for a pressurised medium, which may be either gas or a liquid. In the final position of the mould section 2, as shown in FIG. 3, the exit orifices 16 are located substantially level with the profiled formation 14 of the largest volume. The pressurised medium has a pressure higher than the normal blow-moulding pressure in order to be able to form fine profiled formations. By the simultaneous application of the pressurised medium and movement of the mould section 2, the tube end is forced into the profiled formations 12, 14 in the blow-moulded halves 4 and 5 so that an annular cavity 15 is formed within the tube.

FIG. 4 illustrates, to the left of the vertical centre line, the positions of the mould components prior to deformation of the slug, the positions into which the components move being shown to the right of said centre line. The slug 1 is constricted between the ring 6 of the blow-mould halves 4 and 5 and a conical extension 7 formed on the blow-moulding tube 3. Between the end face of the extension 7 and the mould section 2, a sleeve 18 of high-elasticity material is held. The mould section 2 is shown in its outermost position at the left-hand side of FIG. 4, and is shown in its innermost position at the right-hand side of FIG. 4, where the sleeve 18 is axially compressed and therefore has its diameter enlarged, the slug 1 being held at the point of constriction. As a consequence, the tubular end portion of the slug is forced into the profiled formations 12, 14 in the blow-mould halves 4 and 5. The mould section 2 gives the end face of the article a burr-free finish, without any scrap.

What is claimed is:

1. An apparatus for forming a blown plastic article from an elongated, essentially tubular parison having a longitudinal axis, said parison having one longitudinal portion destined to be blown to the configuration of the blown body portion of said article and a second longitudinal portion destined to form a profiled finish portion of the plastic article, comprising:

a first mold member including an essentially cylindrical core axially insertable into said second parison portion, and an annular shoulder for engaging the annular end of said parison adjacent said second parison portion, said core having generally radial openings therein to receive fluid under pressure;

a sectional blow mold closable onto said parison with said first mold member inserted in said parison, the sections of said blow mold in the displace position defining (a) a blow molding cavity corresponding to the configuration of said article blown body portion, (b) a profiled finish region adjacent the second portion of said parison, and (c) an annular restricting ring between said molding cavity and said finish region, said restricting ring extending radially inwardly and having a diameter less than the corresponding outer diameter of the parison to grip the parison between said molding cavity and the finish region and between said cylindrical core and said restricting ring;

means for displacing said first mold member axially of said parison toward said blow molding cavity to diaplace the annular end of said parison axially toward said profiled finish region by said annular shoulder and to displace at least a portion of said second parison portion radially outwardly into said profiled finish region of the mold; and means for supplying air under pressure through the radial openings in said core to assist in displacing the plastic material of said second parison portion radially outwardly into said profiled finish region.

2. The apparatus as defined in claim 1, characterized by said core being in the form of a truncated cone having a cone angle of between about 0.2° and about 3°.

3. The apparatus as defined in claim 2, characterized by said restricting ring having a diameter less than the outer diameter of the corresponding portion of said parison by about 2% to about 10%.

4. The apparatus as defined in claim 3, characterized by said core being tubular, and further including a blow molding mandrel extending through said core and into the blow molding cavity to supply blow air under pressure, said blow molding mandrel having generally radial openings adjacent the openings in the core to supply said fluid under pressure for forming the finish region of said plastic article.

* * * * *